(12) United States Patent
Salmelin et al.

(10) Patent No.: US 7,492,958 B2
(45) Date of Patent: Feb. 17, 2009

(54) DIGITAL IMAGING WITH AUTOFOCUS

(75) Inventors: Eero Salmelin, Tampere (FI); Janne Haavisto, Kangasala (FI); Ossi Kalevo, Toijala (FI)

(73) Assignee: Nokia Corporation, Espoo (FI)

( * ) Notice: Subject to any disclaimer, the term of this patent is extended or adjusted under 35 U.S.C. 154(b) by 601 days.

(21) Appl. No.: 11/030,724

(22) Filed: Jan. 5, 2005

(65) Prior Publication Data
US 2006/0146144 A1    Jul. 6, 2006

(51) Int. Cl.
G06K 9/40 (2006.01)
G06K 9/32 (2006.01)
(52) U.S. Cl. ....................... 382/255; 382/299
(58) Field of Classification Search ................. 382/255, 382/260, 274–275, 298–299, 312; 359/725; 348/175, 207.99; 250/208.1
See application file for complete search history.

(56) References Cited

U.S. PATENT DOCUMENTS

| | | | | |
|---|---|---|---|---|
| 5,874,994 | A * | 2/1999 | Xie et al. | 348/349 |
| 6,205,245 | B1 | 3/2001 | Yuan et al. | 382/162 |
| 6,452,626 | B1 * | 9/2002 | Adair et al. | 348/158 |
| 6,570,617 | B2 | 5/2003 | Fossum et al. | |
| 6,730,900 | B2 * | 5/2004 | Hsish et al. | 250/208.1 |
| 7,236,306 | B2 * | 6/2007 | Janson et al. | 359/676 |
| 7,256,944 | B2 * | 8/2007 | Labaziewicz et al. | 359/676 |

FOREIGN PATENT DOCUMENTS

EP    1335587 A1    8/2003

* cited by examiner

Primary Examiner—Kanji Patel

(57) ABSTRACT

In digital imaging, in a case where the full resolution digital image needs to be scaled down before presenting it on a display, before the image is scaled down, statistical data is gathered from said the full resolution image data, whereby the gathered statistical data is attached to the image for further processing. The invention relates to a method, to a device, to an imaging module and to a computer program product.

23 Claims, 5 Drawing Sheets

DIGITAL IMAGING WITH AUTOFOCUS

FIELD OF THE INVENTION

This invention relates generally to digital imaging, and particularly to autofocusing in digital imaging. The invention relates especially to those situations, wherein the digital image needs to be scaled down, for example, for preview on a viewfinder display during autofocusing.

BACKGROUND OF THE INVENTION

In the past years, digital imaging devices, such as digital cameras have taken remarkable role in imaging technology. Traditional cameras have got a successor that, however, is very different from them. Traditional cameras rely entirely on chemical and mechanical processes, and there is necessarily no need for electricity to operate with one. However, digital cameras have one or more built-in processors and these cameras record images in an entirely digital form. Because of their electronic nature, digital cameras (or digital camera modules) can be readily integrated to other electronic devices, of which mobile telecommunication devices (mobile terminals) are nowadays the most common examples. Depending on the master device (i.e. the device the camera module is integrated with) the camera module can communicate with several other components and systems of said device. E.g. in a camera phone, the camera module is typically operatively communicating with one or more processors, and in the case of a digital camera, the device can comprise some other type of dedicated signal processing components.

A digital camera has a series of lenses, a lens system that focuses light to create an image of a scene. But instead of focusing this light onto a piece of film, it focuses it onto a semiconductor device that records light electronically. This semiconductor device can be e.g. a CMOS (Complementary Metal Oxide Semiconductor) or CCD (Charge-Coupled Device) sensor. The sensor is mainly composed of a collection of light-sensitive pixels, which convert light into electrical charge and this electronic charge is further converted into digital image data. Typically, digital image data is mainly processed outside the sensor component itself, but nowadays it is also possible to integrate logic and memory into the CMOS sensors. U.S. Pat. No. 6,570,617 B2 discloses a single chip camera, where certain signal and control electronics have been integrated on the same substrate with the photosensitive element.

Deviating significantly from the conventional film type cameras, the modern digital cameras usually have integrated color displays that provide a preview of the frame that the user is capturing. This display can be used as a digital viewfinder instead of a traditional optical viewfinder. The image that is seen on the display is typically taken directly from the image sensor and after scaling down from its original resolution displayed on the viewfinder display. This procedure ensures rapidly updating live display during such preview mode. The preview image is also used for image based autofocusing purposes in the manner described below.

Typically, in the digital camera the image sensor outputs data in lower resolution QVGA (Quarter Video Graphic Array) for the display because of the aforementioned requirement to have rapidly updating preview display and because of the limited pixel resolution of the display. During preview mode image based autofocusing can performed by analysing the low-resolution image and by adjusting the lens system accordingly to improve the focusing. The user can check the image displayed on the viewfinder display to see if the autofocusing has been successfully applied. Also non-image based focusing can be applied here by using, for example, various distance measuring methods known in the art. This lowered image resolution intended for viewfinder preview is, however, not high enough to perform accurate image based focusing in the modern multimegapixel, e.g. 3 megapixel cameras. In other words, the scaled down image resolution is not high enough to provide basis for accurate image analysis to fine tune autofocusing Therefore, before the image is captured, in addition to the aforementioned prefocusing measures the camera needs to typically perform some final focusing steps based on higher resolution image data.

In most digital camera devices, when the user pushes capture button half way down, the autofocusing is performed based on the scaled down viewfinder image data as described above. When the user decides to take the picture and pushes the capture button all the way down, the camera device performs the final focusing steps. During the final focusing the image sensor starts to output high-resolution image data in order to provide the best possible basis for the focusing algorithms. From these high-resolution images focus measure values are gathered/calculated according to selected image blocks (e.g. from the center).

Depending on how much the results of the prefocusing based on the scaled down images, and the results of the final focusing based on the high resolution images deviate from each other, the final focusing steps create a certain delay before the image can actually be recorded. In addition, during the final focusing low resolution images for the viewfinder may not be produced or updated properly. In some digital cameras, even when the capture button is pressed half way down and the autofocusing (prefocusing) function is enabled, regular updating of the viewfinder image may be neglected.

The operation of the autofocusing and previewing functions of the prior art digital cameras may deviate in their details somewhat from the description given above, but it can be realized that the prior art systems have certain severe limitations especially in respect to providing exact focus data from megapixel images continuously and without unnecessary delays. It can be realized that in prior art systems exact focus data is not available all the time, because at certain times only scaled down low resolution image intended for the viewfinder might be made available. Also, in some cases when the high-resolution images are captured for final focusing, the viewfinder images might not be updated properly.

User experiences in digital imaging are most affected by the delay that occurs within the capturing operation. In other words, the delay between pressing the capture button and the actual image capture moment should be minimized. In current digital cameras the focusing is initiated by the user pushing the capturing button half way down. When the push button is pushed half way, the digital camera usually tries to find the best focus and locks there. If the focus is not good enough, the button can be released and pushed again to find a better focus. When the button is then pushed all the way down, the image is captured immediately if the focusing was already finished properly at the time when the button was pushed half way. If the focusing was not ready and the button is pushed all the way down, the camera needs to finalize the focusing at the latest at this point, and this consumes undesirably more time. This means, that after the user has pushed the button, he/she needs to wait a while for the camera to complete the focusing. If the user, during this short moment of time, moves the camera, the image will naturally become unfocused. This delay affects also the general use of the camera. With a digital camera a series of images can quite easily be captured, which means pushing the capturing button constantly, e.g., during a target operation, for capturing every phase of the operation. However with said moment, even though the button is pushed repeatedly, the "waiting time" typical for prior art devices prevents "every phase of the operation" to be captured.

It can be seen that even though digital cameras provide new and interesting ways for imaging, there still is a need for improved focusing methods, which are more accurate and faster than the ones in current technology, and that can cope with the ever increasing sensor resolutions. In addition, such methods should also work in situations where the image needs to be scaled down for generating a higher picture frequency, for example, for preview purposes. The following description discloses a solution that addresses these needs.

SUMMARY OF THE INVENTION

The solution includes a method, a device, an imaging module and computer program product according to which image focusing can be improved.

The method according to one embodiment comprises steps for providing a full resolution image, providing a scaled down partial resolution image based on said full resolution image, calculating statistical data based on the full resolution image data and providing said statistical data together with the scaled down image data for further processing steps.

The device for digital imaging comprises an image sensor for providing a full resolution image, a processor for providing a scaled down partial resolution image based on said full resolution image, and calculating means for determining statistical data based on the full resolution image data and providing said statistical data together with the scaled down image data for further processing.

The imaging module for digital imaging comprises an image sensor for providing a full resolution image, a processor for providing a scaled down partial resolution image based on said full resolution image, whereby said imaging module further comprises calculating means for determining statistical data based on the full resolution image data and providing said statistical data together with the scaled down image data for further processing.

The computer program product in digital imaging comprises computer readable instructions being configured to provide a full resolution image, to provide a scaled down partial resolution image based on said full resolution image, wherein by means of said computer readable instructions statistical data is calculated based on the full resolution image data and said statistical data is provided together with the scaled down image data for further processing.

This invention has considerable advantages when it comes to digital imaging and especially to the focusing operation. Because of the invention, exact autofocus is available all the time at the target frame rate. In addition the image can always be kept in focus. At the time the user pushes the capture button the focused image can be captured instantly as there is no need to delay. Not only is this method applicable with still images, but also in video imaging the autofocus is more accurate.

DESCRIPTION OF THE DRAWINGS

A better understanding of the invention may be obtained from the following examples taken in conjunction with the accompanying drawings.

DETAILED DESCRIPTION OF THE INVENTION

Figure 1:
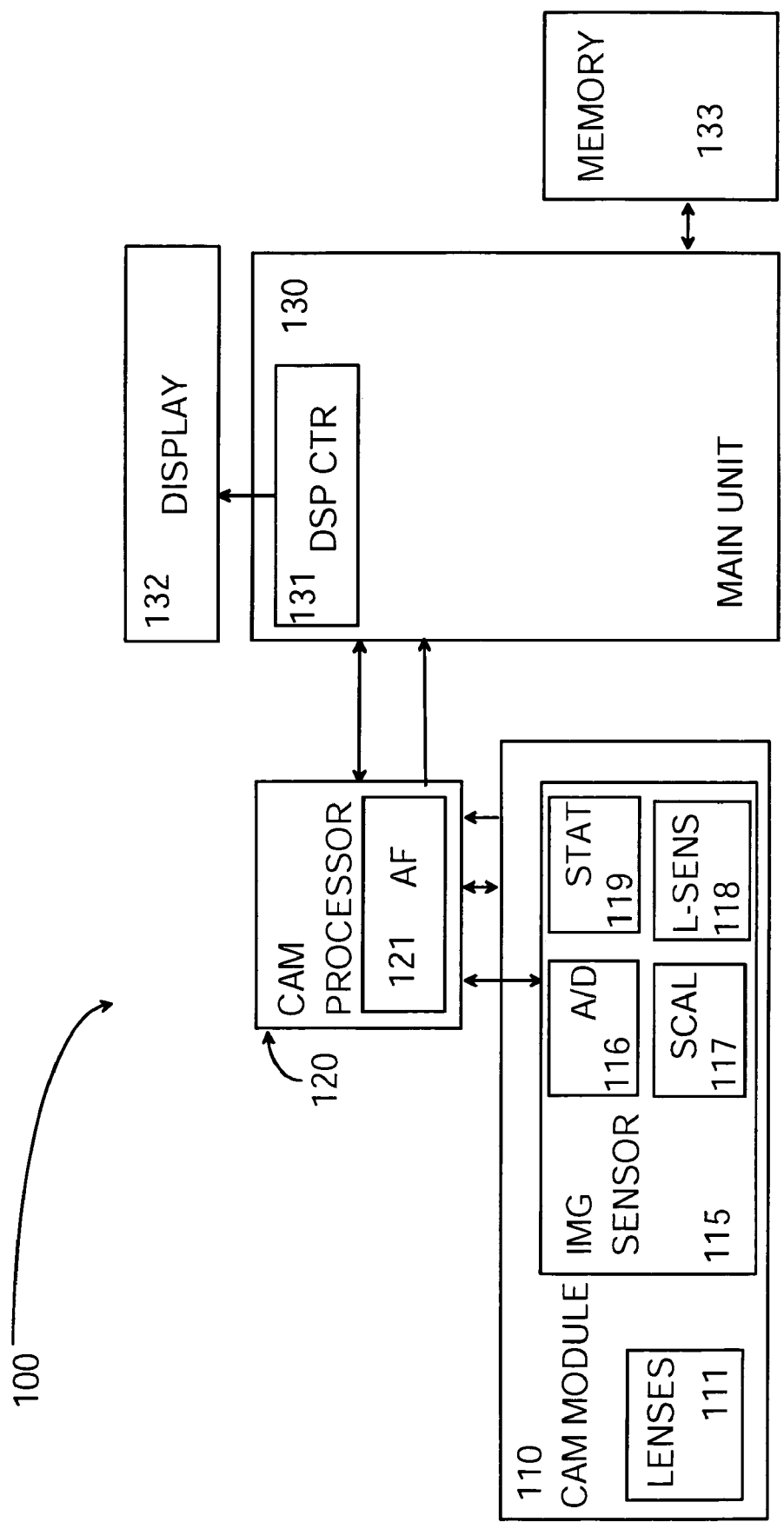
FIG. 1 illustrates an example of the imaging device structure.

Although specific terms are used in the following description for the sake of clarity, these terms are intended to refer only to the particular structure of the invention selected for illustration in the drawings and they are not intended to induly define or limit the scope of the invention. In the description a general term "image" is used for defining such forms of an image data that are visual. Examples of images are still image, video image and a preview image that is used during capturing process. "Raw image" in this description relates to such an image data that is not processed in any manner. Raw image is data that is captured by the image sensor but not interpreted. "Processed image" is a result from processed raw image data. The processed image can be interpreted visually, but not necessarily. An "imaging device" can be any device comprising means for digital imaging. Therefore, the imaging device can be a digital camera, imaging phone or some other device, that can either include imaging means or be connected to one (e.g. a web camera).

An imaging device that implements the method disclosed by this application is now described by referring to FIG. 1, where an imaging device structure is presented in very simplified manner. The drawing of the imaging device presents such components of a digital camera, to which this method significantly contributes.

The imaging device 100 comprises a camera module 110, a camera processor 120 that can be an audiovisual engine, and a main unit 130. The purpose of the main unit 130 is to be in main charge of the various applications of the device 100. The main unit 130 comprises, for example, a display controller 131 for controlling the display 132 of the imaging device 100. The main unit 130 is also arranged to store images and other information to a memory card 133 or other memory means. In addition, the main unit 130 can have communication means for forming a data transfer connection to external memory means such as a personal computer. These communication means can be a data cable or a wireless system. The main unit 130 may further have other capabilities or connections to other systems, components or databases, which improve efficiency and functionality of the imaging device.

In this example the camera processor 120 comprises at least means for determining autofocus 121. The camera processor 120 may (depending on the situation) also be capable of processing the images according to known image processing methods. In this example, the camera processor 120 is illustrated as an independent component, but it should be appreciated that the camera processing functions can be carried out by a processor of the main unit 130. Other configurations are possible as well. For example, statistical data needed for a statistical calculation may be gathered by the camera module 110, the statistical calculation done by the camera processor 120 and the autofocus control done in the main unit 130. By understanding these variations of the configuration, the other possible configurations are understood as well.

The camera module 110 comprises lenses 111 via which the light is produced to an image sensor 115. In this example, the image sensor 115 comprises an analog-to-digital converter 116 and means to introduce a gain. Some image sensors can comprise only a gain, and some image sensors may not include either. In this example the image sensor comprises also a video image scaler 117 and a light sensitive area 118. The image sensor 115 can also be introduced with statistical means 119 for providing statistical data relating to said image. The statistical means 119 may be capable of both gathering and calculating autofocus statistics, but the statistical means 119 can also be arranged only for gathering statistical data, whereby the statistical calculation is carried out by other calculation means.

In relation to some other image sensors, such as CCD-sensors, the sensor may comprise only the light-sensitive area and charge transmitters. In addition to these, the sensor needs an interface to the electronic components described earlier. The interface is arranged to transmit analog charge values from the sensor and timing needed by the charge transmitters to the sensor.

Figure 2:
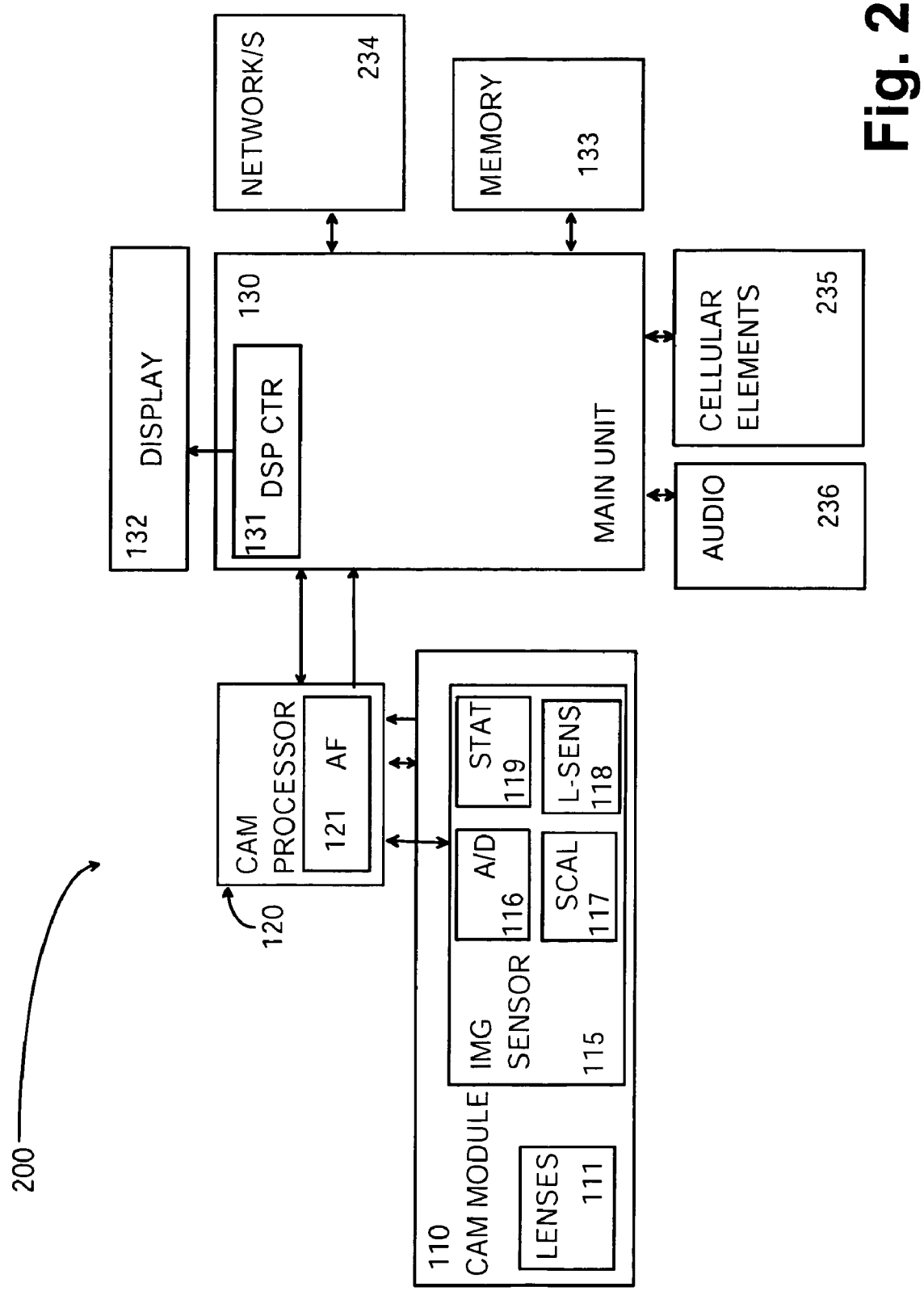
FIG. 2 illustrates another example of the imaging device structure.

Another example of the imaging device is illustrated in FIG. 2, wherein an imaging phone 200 is presented. The imaging phone 200 comprises the components described with reference to FIG. 1 but also such components that are needed with wireless communication functions. For example, in this FIG. 2 the device 200 comprises audio means 236, various networking means 234 and basic cellular components 235 (e.g. keyboard, power management). One skilled in the art will appreciate that the device 200 can incorporate other functions and components with the ones mentioned here.

Figure 3:
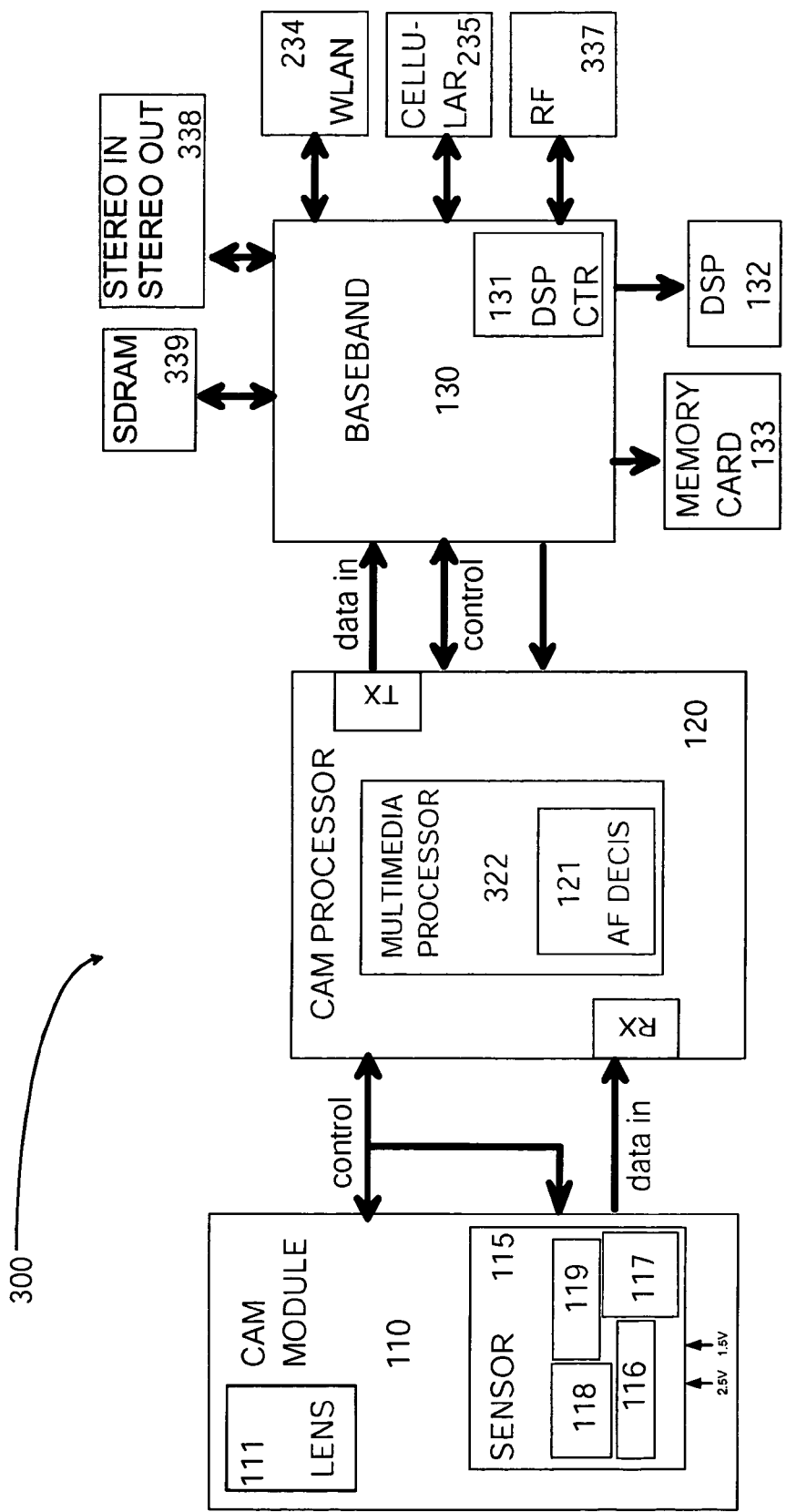
FIG. 3 illustrates yet another example of the imaging device structure.

Yet another example of the imaging device is presented in FIG. 3. The imaging phone 300 illustrated here is a bit more detailed drawing of the imaging phone 200 (FIG. 2). The means for determining the autofocus 121 are in this figure arranged into multimedia processor 322. In this FIG. 3, the imaging phone comprises also a WLAN connection 234, but it will be evident that also this additional short range network capability can be some other short range network, e.g. Bluetooth or Infrared. Also into this FIG. 3 a receiver-transmitter 337 is illustrated. As a main memory, the imaging phone 300 of this example comprises SDRAM memory 339. As a main unit 130 in this figure operates a phone in baseband. Further the imaging phone 300 is capable of stereo input and stereo output 338. It will be appreciated by the man skilled in the art that, instead of the main unit, also the camera processor may be in connection with components, such as a display, an audio, a memory card or an external memory.

Figure 4:
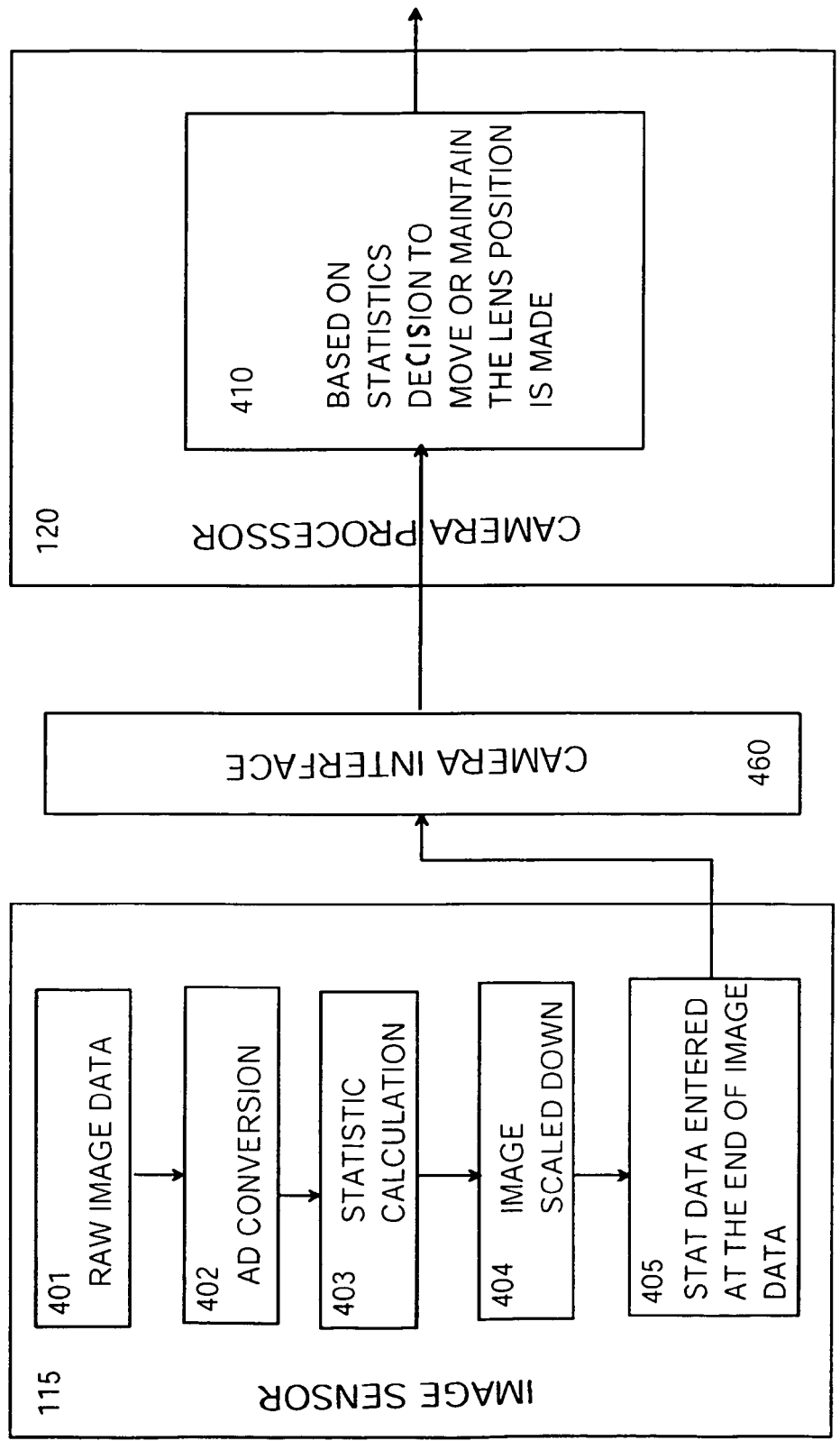
FIG. 4 illustrates an example of method steps and the division of them between two camera components.

One example of the imaging procedure is illustrated in FIG. 4. The procedure starts by the user viewing an imaging target by the imaging device. Raw image data 401 is acquired through the lenses to the image sensor 115. The image sensor 115 is running at high-resolution mode. In traditional cameras, when the viewfinding is done the image is usually a low resolution image, and for capturing still images and for focusing purposes the image sensor outputs high-resolution image. However, in this description the focusing can be done by using any selected area in the image, as will be evident from the following description.

The invention aims to remove the prior art limitations and to present a method, where scaled down image data is available for preview, but at the same time high quality statistical data from a high-resolution image is also available for image-based autofocusing. When such high quality statistical data is substantially continuously available for focusing, this speeds up the autofocusing process and minimizes the delays during the final image capture.

Figure 5:
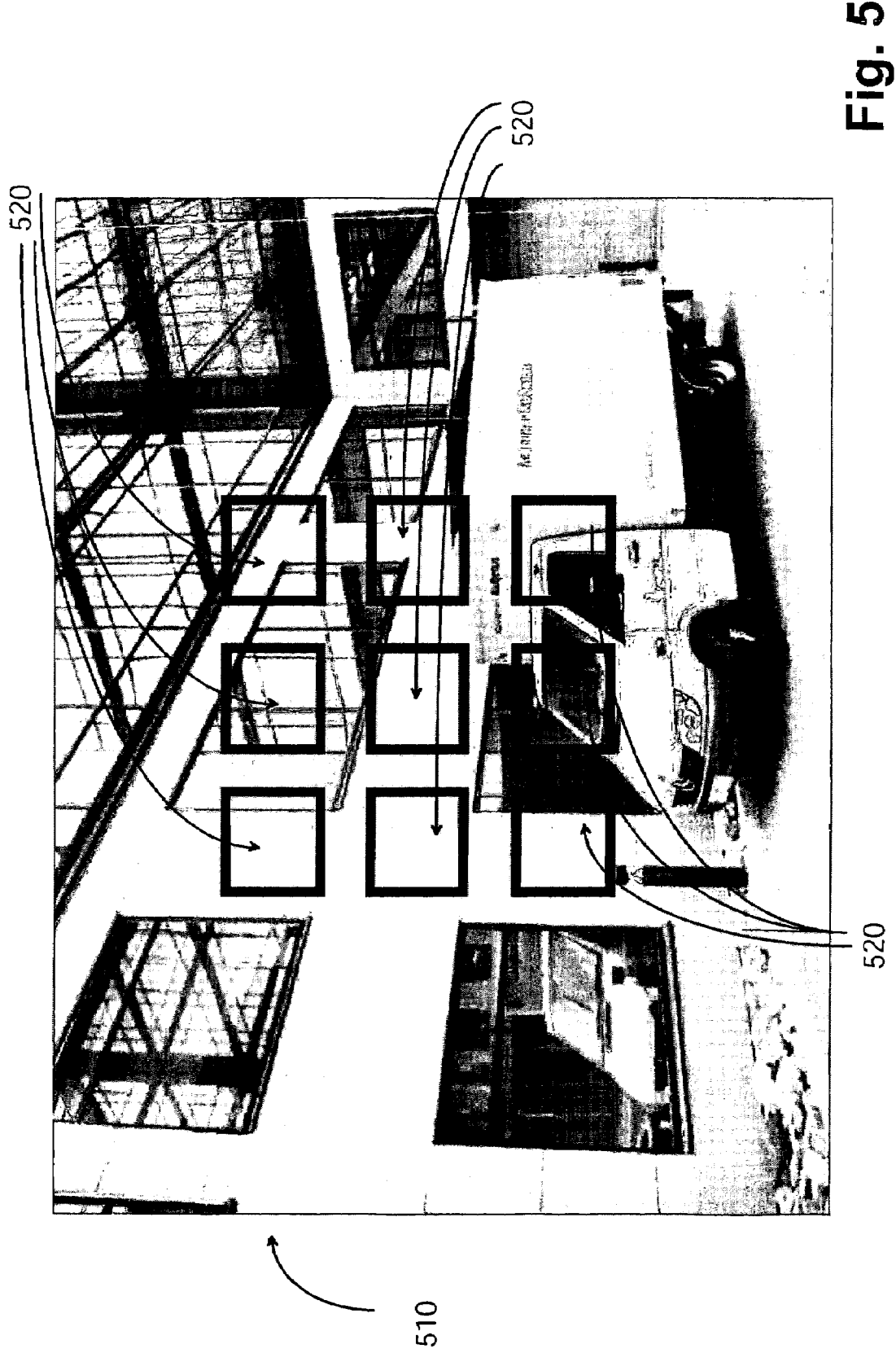
FIG. 5 illustrates an example of an image with blocks for statistical data calculation.

The procedure before image-based autofocusing can be implemented according to the invention in various ways. The basic idea is that after full resolution image is captured 401 in the image sensor and analog-to-digital conversion 402 is done, a statistical data 403 concerning the image is gathered. The statistical data is calculated in the image sensor from several areas of the image, for example see FIG. 5 where, in the image 510, the statistical data is calculated from blocks 520. The number of blocks is not relevant, but it is more advantageous to have more than one block for the calculation. Usually the statistical gathering is carried out in a center part of the image, in several areas and in several different frequency bands. When there are more blocks to be used in the statistical calculation, it is possible e.g. to select a certain group, which represents the best focusing.

When the statistical data is gathered/calculated 403, the image is scaled down 404 to a desired partial resolution, which is normally used in preview, and which can be for instance QVGA-resolution. In this example the statistical data is attached 405 at the end of the image data. However in some situations it may be more advantageous to transfer the statistical data at another time, e.g. right after it has been calculated. It should also be noticed that not all the image data is needed at the same time, but the gathering and scaling can proceed accordingly as the image data is getting ready. Therefore, the statistical gathering may be done one line at the time by repeating steps 401-404 and once in a while sending data further. The sending can also in this case be operated at the end of the image 405. It will be appreciated by anyone skilled in the art, that the procedure may incorporate other image processing functions between steps 401-410, which are not disclosed here. As an example, processes such as clamping, noise reduction are mentioned.

It should be appreciated, that according to the current invention statistical data for autofocusing purposes is determined from the high-resolution image, and only after that is the image scaled down for other purposes, such as for a live viewfinder display. Therefore, statistical data to facilitate high accuracy autofocusing is available continuously as well as a scaled down image for preview. In prior art solutions this has not been possible, because the system needs to switch from preview mode to a specific autofocusing mode. During the first mentioned mode a scaled down image for preview is available, but there is no high quality statistical data calculated from the high-resolution original image. In the later mode high-resolution autofocusing data is available, but the preview display cannot be updated regularly, because scaled down image data is missing.

The step of statistical gathering, i.e. the actions required to analyze an image to produce statistical data describing the state of focus of said image, can comprise any steps or methods known in the art or any other steps suitable for such purpose. The invention should not be limited by the nature of those steps, but it is only important when and where those steps are performed.

The image data with the statistical data is further delivered to camera processor 120 via camera interface 460. The camera processor 120 makes a decision for autofocus 410, i.e. for moving the lenses or for maintaining the current position of the lenses. The camera processor 120 can decide, based on the statistical data gathered already at the sensor, which way the lenses should be moved without going through the entire image data. The camera processor 120 may decide which block in the image is used for focusing. A decision for lens movement based only on analysis of the downscaled image would be inaccurate, and therefore the method according to the invention is preferable over the prior art methods.

The focusing decision is based on statistical data. Depending on the characteristics of the image sensor and a last focused value, at least one target value can be defined to be used for decisions. The statistical data is compared to the target value, and lenses are moved according to how much the current statistical data deviated from said target value.

When a statistical datum is less (worse) than the target value, the lenses are moved into that direction which is supposed to be the better direction. When the moving is done, the statistical datum is checked and if the result is good enough, the lenses are kept at that place. If the result is better, but not good enough, the moving is continued into that direction. If the result is worse the lenses are moved into opposite direction, where the statistical datum is checked and a decision of the next step is made. If the result improved sufficiently, the lenses are kept at that place or, if needed, the next place can be checked as well. If the result is worse also here, the lenses are brought back to the original place. The target value is redefined. In every step the target value is redefined when the lenses are moved to a new place or back to a previous place. If the target value becomes too bad, it may indicate that the focus is lost, whereby the scanning can be redone in the whole focus area. It should be also noticed that whether there are statistical data from many different frequencies, it is possible to examine from their changes when the focus is improved and into which direction the lenses should be moved. It enables also observations for when the focusing is needed. For example, the lower the frequency band best target value ends up, the more probably the lenses should be moved into some direction.

The above describes a situation, where the whole focus area has been scanned through and the lenses are in good focus. The first scanning can be carried out by starting the scanning from a certain point and by scanning the whole image until the best new focusing is found. The best focus can be found by going through all the lens positions and determining at which position the focus value reaches maximum value or by quick scanning and then by focusing.

In the previous examples the image sensor is capable of gathering statistical data, scaling the image and entering the statistical data to image. The camera processor is hence responsible for processing, autofocusing and functions relating to it. However, it is possible to divide the tasks differently between the camera module and camera processor. However it should be kept in mind, that even if the tasks are shared differently, the basic idea is not dismissed, which is to gather the statistical data before scaling down the image. Therefore, when the basic idea is remembered, it will be appreciated that either the camera module or the camera processor or main unit may implement the processing. It is possible to deliver pre-gathered statistical data or smaller high-resolution blocks from the camera module, from which the statistical data can be calculated afterwards. It is also possible to deliver the gathered or calculated statistical data with the raw image data or the processed image data (and possibly even scaled image data) and it is possible as well to gather the statistical data from the raw image data or the processed image data. However, in the later situation the processing and scaling should be carried out by the camera module. The autofocus is decided by the camera processor or the main unit.

In these examples the image sensor is a CMOS sensor, where logic and memory can be integrated on the same substrate as the photosensitive elements. However, the invention is not limited to the use of CMOS sensors. CCD sensors and also other image sensors may be used as well when they are arranged to incorporate suitable circuitry and logic for determining statistical data for autofocusing purposes.

Anyone skilled in the art will appreciate that the system may incorporate any number of capabilities and functionalities, which are suitable to enhance the efficiency of the focusing functions. Additionally the system may provide other manual or automatic services for maintaining data.

Therefore, it will become evident that variations and modifications of the examples of embodiment described are possible without departing from the scope of protection of the invention as set forth in the claims.

We claim:

1. A method comprising
capturing a full resolution digital image data,
providing a partial resolution image data based on said full resolution image data,
calculating statistical data relating to a focusing state of the full resolution image data, and
sending said statistical data and the partial resolution image data together for defining autofocus for the image.

2. The method according to claim 1 comprising displaying said partial resolution image data, and focusing based on said statistical data.

3. The method according to claim 1, comprising gathering the statistical data from raw image data.

4. The method according to claim 1, comprising gathering the statistical data from at least one predetermined part of said full resolution image data.

5. The method according to claim 1, comprising gathering said statistical data in an image sensor, wherein said full resolution image data is also captured in said image sensor.

6. The method according to claim 1, comprising attaching said statistical data to said partial resolution image data.

7. The method according to claim 1, comprising gathering said statistical data from a still image or a video image.

8. A device comprising
an image sensor to capture a full resolution digital image data,
a processor to provide a partial resolution image data based on said full resolution image, and
a statistical calculator to determine statistical data relating to a focusing state of the full resolution image data,
wherein said device is arranged to send said statistical data and said partial resolution image data together for defining autofocus for the image.

9. The device according to claim 8, wherein the image sensor is arranged to gather the statistical data from raw full resolution image data.

10. The device according to claim 8, wherein the image sensor is arranged to gather the statistical data from at least one predetermined part of said full resolution image data.

11. The device according to claim 8, wherein the device is arranged to calculate said statistical data before providing said partial resolution image data.

12. The device according to claim 8, wherein the device is arranged to attach said statistical data to the partial resolution image data.

13. The device according to claim 8, wherein said statistical data is arranged to be gathered from a still image or a video image.

14. The device according to claim 8, wherein said image sensor is arranged to operate in a high resolution mode, and said partial resolution image data has a lower resolution.

15. The device according to claim 8, wherein said image sensor is a CMOS sensor, said statistical calculator being arranged within said sensor.

16. The device according to claim 8, comprising a digital camera.

17. The device according to claim 8, comprising an imaging phone.

18. An imaging module for digital imaging comprising
an image sensor for providing a full resolution image data,
a processor for providing a partial resolution image based on said full resolution image data,
a calculator for determining statistical data relating to a focusing state of the full resolution image data,
wherein said imaging module is arranged to send said statistical data together with said partial resolution image data for defining autofocus for the image.

19. The imaging module according to claim 18, wherein said image sensor is a CMOS sensor, said statistical calculator being arranged within said sensor.

20. A computer readable medium comprising computer program instructions stored thereon, wherein said instructions when executed are for
capturing a full resolution image data,
providing a partial resolution image based on said full resolution image data,
calculating statistical data relating to a focusing state of said full resolution image data, and
sending said statistical data and said partial resolution image data together for defining autofocus for the image.

21. A device comprising
imaging means for capturing a full resolution digital image data,
image scaling means for providing a partial resolution image data,
calculating means for calculating statistical data relating to a focusing state of said full resolution image data, and
means for sending said statistical data and said partial resolution image data together for defining autofocus for the image.

22. The imaging module of claim 18, for use in a camera in which autofocusing is performed in a preview mode based on said partial resolution image data until final focusing is performed in a fine-tune autofocusing mode based on higher resolution image data from said full resolution image data existing in said preview mode, said calculator for determining said statistical data relating to a focusing state of said higher resolution image data before said processor provides said partial resolution image data so that said camera is able to perform said final focusing based on said higher resolution image data existing in said fine-tune autofocusing mode and said statistical data that was already determined in said preview mode.

23. The computer readable medium of claim 20, for use in a camera in which autofocusing is performed in a preview mode based on said partial resolution image data until final focusing is performed in a fine-tune autofocusing mode based on higher resolution image data from said full resolution image data existing in said preview mode, said calculator for determining said statistical data relating to a focusing state of said higher resolution image data before said processor provides said partial resolution image data so that said camera is able to perform said final focusing based on said higher resolution image data existing in said fine-tune autofocusing mode and said statistical data that was already determined in said preview mode.

* * * * *